July 2, 1940.  S. T. GOSS ET AL  2,206,011
METAL WORKING MACHINE
Filed May 2, 1938  3 Sheets-Sheet 1
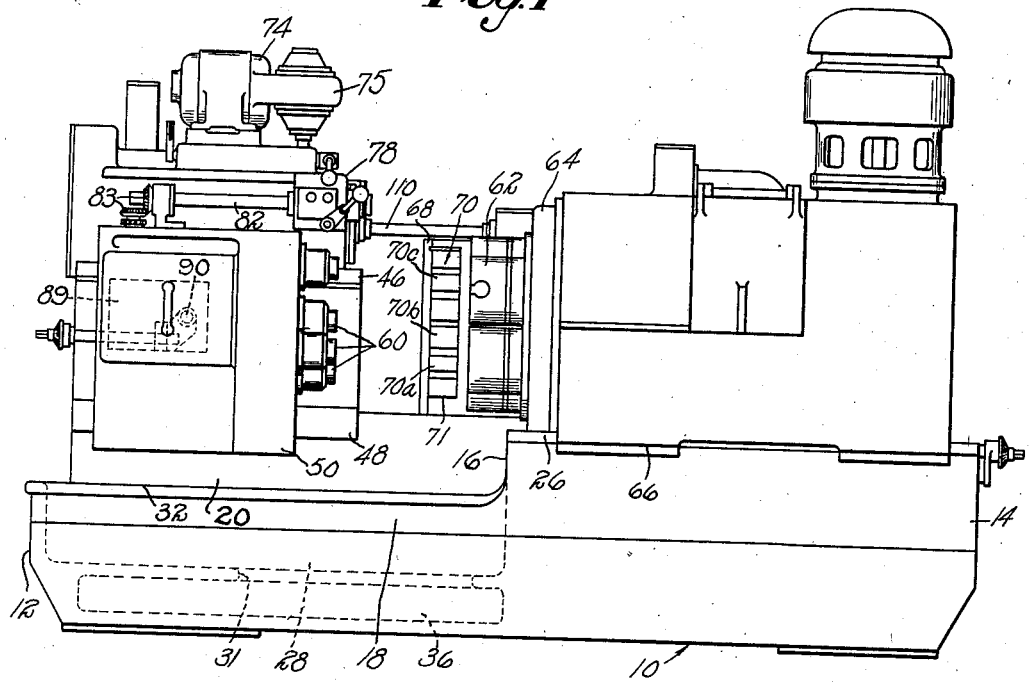
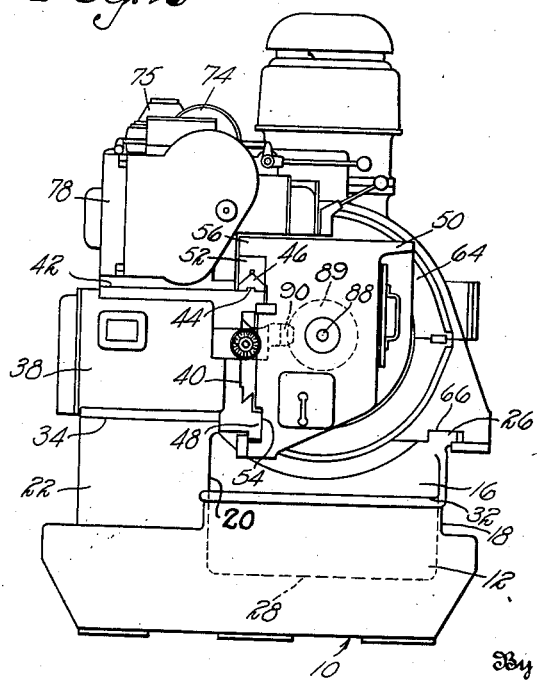
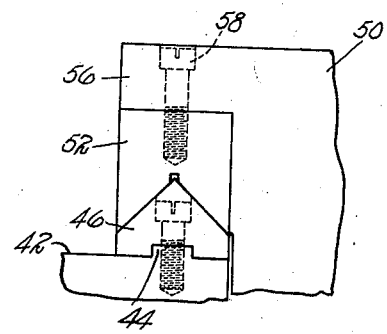
Inventor
STANLEY T. GOSS
JOSEPH J. SPRING
By W. Clay Lindsey
Attorney July 2, 1940.   S. T. GOSS ET AL   2,206,011
METAL WORKING MACHINE
Filed May 2, 1938   3 Sheets-Sheet 2

Inventor
STANLEY T. GOSS
JOSEPH J. SPRING
By W. Clay Lindsey
Attorney

July 2, 1940.  S. T. GOSS ET AL  2,206,011
METAL WORKING MACHINE
Filed May 2, 1938  3 Sheets-Sheet 3

Inventor
STANLEY T. GOSS
JOSEPH J. SPRING
By  N. Clay Lindsey
Attorney

Patented July 2, 1940

2,206,011

UNITED STATES PATENT OFFICE 2,206,011

METALWORKING MACHINE

Stanley T. Goss, New Britain, and Joseph J. Spring, Kensington, Conn., assignors to The Goss and De Leeuw Machine Company, New Britain, Conn., a corporation of Connecticut Application May 2, 1938, Serial No. 205,476

12 Claims. (Cl. 29—38)

The present invention relates to improvements in metal working machines and more particularly to automatic chucking machines wherein there is provided a plurality of tooling stations supported by one or more carriers and a plurality of work holding devices supported by a carrier. The tooling stations and work holding stations are so positioned relative to one another that successive pieces of work may be operated upon by one or more tools.

Machines of this type have heretofore been made with the tooling stations supported on a carrier slidable along horizontal ways provided on a bed or base support, the carrier being moved longitudinally toward and away from the work station. Intermediate of the tool stations and work stations, the bed was provided with a trough into which the chips and cut away metal fell. The cut away metal would rapidly pile into heaps and interfere with the movements of the carriers, necessitating the shutting down of the machine while the metal was removed, often resulting in the loss of five to ten minutes running time per hour. Moreover, the small chips would fall or fly onto the horizontal ways, whereupon the carriers would move over same, often doing serious damage to the machine and necessitating a complete shutdown while the carrier was removed and the ways repaired.

An object of the present invention is to provide a machine wherein the foregoing disadvantages are eliminated.

A still further object is a machine wherein the tool carrier is supported on vertically arranged ways which support and space the carrier above and away from the base of the machine, enabling the trough to be cleaned out while the machine is operating.

A still further object is the provision of a support for the carrier which is arranged to one side of the base and also serves as a support for a second tool carrier which is arranged at right angles to the first tool carrier and is adapted to carry tools to do outside finishing on the pieces carried on the working stations.

A still further object is a machine of this kind wherein the tool carriers are so positioned that the driving means therefor may be readily interconnected to enable operation of same through a single motor.

A still further object is an improved tool carrier for outside work wherein the carriers are supported within a casing in superposed relationship and slidable on and relative to one another.

A still further object is a machine of this type which is particularly compact, of relatively simple construction, highly efficient, and economical both to manufacture and operate.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figure 1 is a side view of one embodiment of the invention;

Fig. 2 is an end view of the embodiment of Fig. 1;

Fig. 8 is a fragmentary detailed view of one of the supporting ways.

Figures 3, 4, 5:
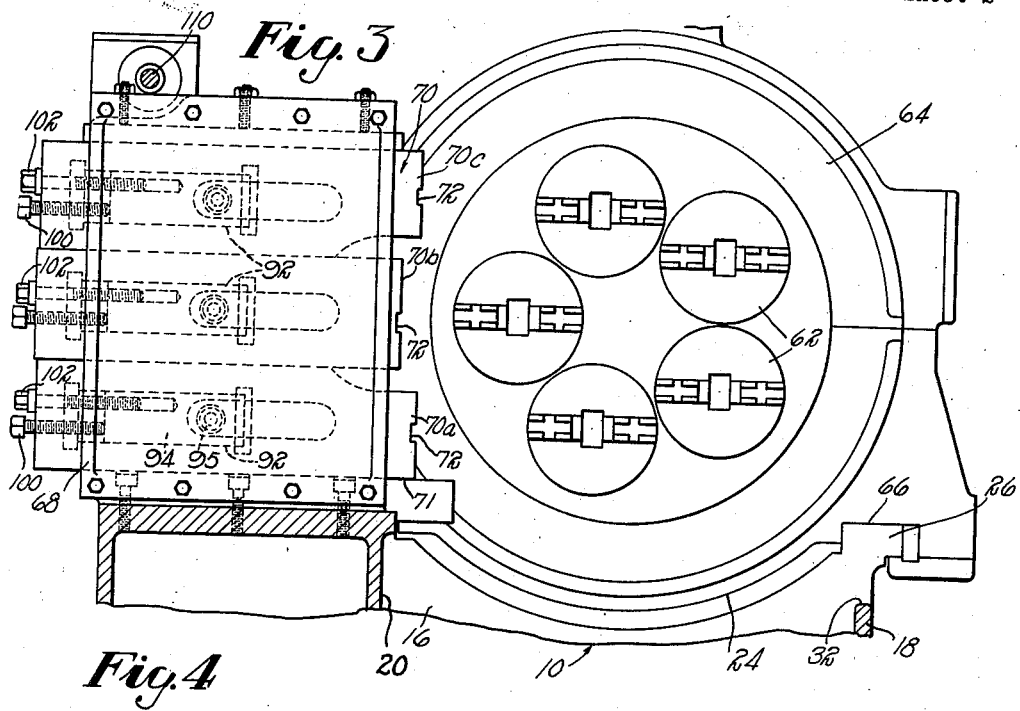
Fig. 3 is a sectional view showing the cross slide tool carriers and their position relative to the work holding chucks.
Fig. 4 is an end view of the cross slides of Fig. 3.
Fig. 5 is a view on the line 5—5 of Fig. 4.
Figure 6:
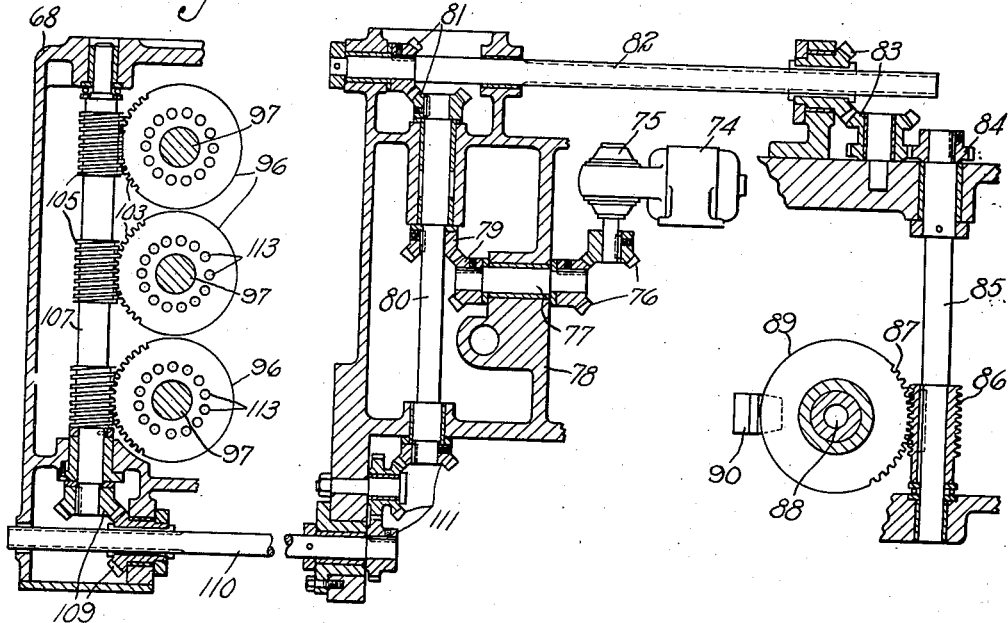
Fig. 6 is a more or less diagrammatic view of the drive mechanism for the tool carriers and cross slides.
Figure 7:
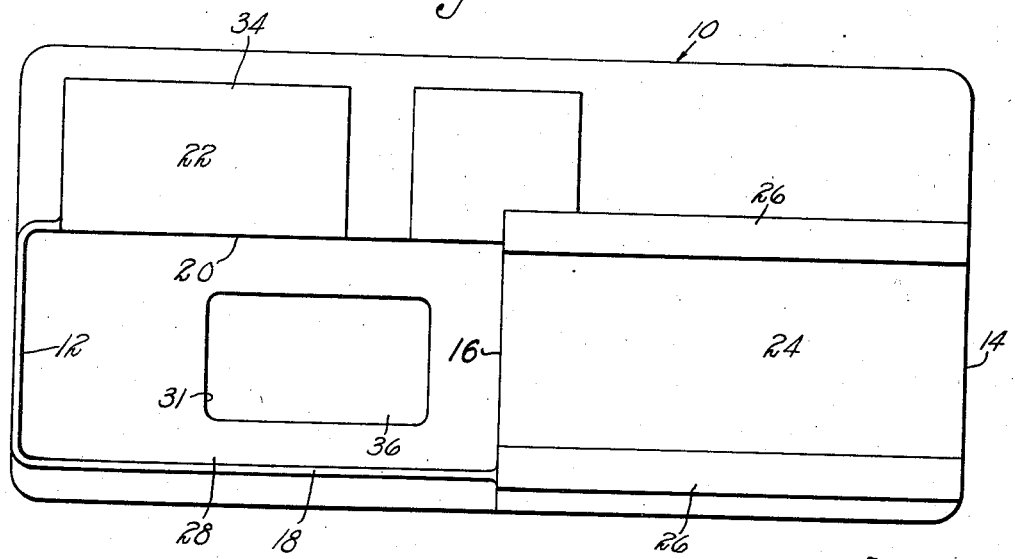
Fig. 7 is a plan view of the base of the machine.

Referring to the drawings, there is provided a base or bed 10 having end walls 12 and 14 and a transverse wall 16 spaced approximately mid way between the end walls; the transverse wall 16 and end wall 14 being of greater height than the end wall 12. The base is further provided with a forward side wall 18 and a rear side wall 20; that portion of the rear side wall 20 intermediate of the end wall 12 and transverse wall 16 also defining the inner wall of a rectangular support 22. The high part of the base between the end wall 14 and the intermediate transverse wall 16 is provided with a table top 24 having a pair of spaced horizontally arranged parallel ways 26 positioned adjacent the side walls thereof and adapted to carry a work support, as will hereinafter be described.

The low part of the base is further provided with a trough 28 defined by the base walls 12, 16, and 18 and the inside wall 20 of the vertical support 22. Preferably, the top peripheral edge 32 of the wall 12 and that part of the wall 18 intermediate of wall 12 and wall 16 is somewhat lower than the level of the table top 24. The bottom of the trough 28 may be provided with an opening 31 having any suitable screen therein to permit the oil to flow therethrough onto the bottom 36 of the base from which it may be withdrawn in any suitable manner. The vertical support 22 is provided with a flat top 34 of substantial width and on the same level as the table top 24.

Supported on the top face 34 of the support 22 and secured to the support in any suitable manner is an extension member 38 having a side face 40 and a top face 42. The top face 42 of the member 38 is provided with a key 44 adjacent the side face 40 and to which is removably secured a horizontally arranged way 46 having generally the shape of an inverted V and preferably has the shape of an isosceles triangle with its base parallel to the base 42. Disposed below the way 46 and on the side face 40 of the member 38 is a vertically disposed way 48, the way 48 preferably being approximately on the level of the table top 24 and above the peripheral edge 32 of the base 10.

The support 22 and extension member 38 are adapted to carry a tool carrier 50, which tool carrier is provided with slides 52 and 54 adapted to cooperate with the ways 46 and 48 of the extension member 38. As indicated in Fig. 2, the carrier 50 has an outwardly extending projection 56 to which the slide 52 is removably secured in any suitable way, such as by bolts 58. As the projection 56 overlies the top face 42 of extension 38, the slide 52, the lower face of which is notched as an inverted V, overlies the way 46. The slide 54 is disposed below the slide 52 and is adapted to engage the way 48 of extension 38 and is preferably located below the center line of the carrier 50, whereas the slide 52 is located above the center line, thus tending to equally distribute the weight of the carrier 50 relative to the ways.

The carrier 50 is provided with a plurality of tool holders 60 concentric with the center thereof and which are aligned opposite a plurality of work holding chucks 62 carried by a work supporting head 64; there being one less tool holder than the number of work chucks. The work supporting head is provided with slides 66 adapted to engage the horizontal slides 26 of the table top 24. The vertically disposed ways of the support 22 and the horizontally arranged ways 26 of the table top 24 are so positioned relative to one another that the center of the tool carrier 50 and the center of the work supporting head 64 are in axial alignment, whereupon as the tool carrier is moved longitudinally it will move the tools into and out of engagement with the pieces carried in the work holding chucks.

There is also carried on the top face 34 of the support 22 and positioned intermediate of the chucks 62 and spindles 60 a casing 68 supporting therein a plurality of cross slides 70a, 70b, and 70c; each slide being adapted to carry at its inner end 72 a suitable tool which, as the slides are moved inwardly, will engage and perform an operation on the outside surface of the work piece carried in the aligned work holding chuck.

From the foregoing, it will be seen that as the tools carried by the spindles 60 and by the cross slides 70 operate upon the pieces carried on the work chucks 62, the metal cut off by the same will drop into the trough 28 of the base and any oil that drops therein will flow through the screen 30 into the base 36 and then be drawn off. However, as support 22 positions and spaces the carrier 50 above the trough 28, it is possible without stopping the machine to remove the metal therefrom by drawing it out over the peripheral edge 32 which extends from the forward and outer edge of the wall 16 around to the support 22. If desired, a conveyor could be placed beneath the carrier 50 to receive the cut metal and continuously deposit it over the top edge of the end wall 12 into a suitable receptacle. Inasmuch as the top way 46 is spaced considerably above the center of the carrier and work head, there is little danger of flying chips landing thereon, and even if they did, due to the inverted V shape of the way, they would readily slide off. As indicated, both the way 46 and slide 52 are removably secured in place. Thus if undue wear occurs, it will be possible to re-adjust the carrier into alignment by shimming behind the slide 52 or, if necessary, renewing these parts.

The longitudinal movement of the tool carrier 50 to carry the tool spindles into and out of engagement with the work pieces is accomplished by suitable connections to a motor 74. The motor 74 connects through a suitable reduction gear 75 and bevel gear 76 to a short shaft 77 in the casing 78, which shaft 77 in turn drives a vertically arranged shaft 80 through suitable bevel gears 79. Shaft 80, through meshing bevel gears 81, drives the horizontally arranged shaft 82, which shaft, through meshing gears 83 and driven gear 84, drives a shaft 85. Shaft 85 is provided with a worm 86 adapted to engage a gear 87 mounted on a shaft 88, on which shaft there is also mounted a cam 89 adapted to engage a follower 90.

The casing 78, shaft 82, and follower 90 are all supported in fixed position on support 22, whereas the gears 83, 84, and shaft 85, gear 87, shaft 88, and cam 89 are all supported on and movable with tool carrier 50; the gear 83 being keyed to the shaft 82 to rotate therewith as it moves longitudinally along same. Thus upon rotation of the motor 74 the cam 89 will be rotated to move the tool carrier 50 longitudinally along the ways 46 and 48 into and out of operative position.

Means are also provided to index the chucks to successive stations and rotate the chuck at each successive station. These means may be the same as those fully described and set forth in the patent to Spring No. 2,053,748, and as they form no part of the invention they need not be further described herein.

The motor 74 is also adapted, through suitable connections, to cause movement of the cross slides 70 transversely in the casing 68 to carry the tools carried thereby into and out of operative position relative to the chucks 62. As may be seen from Fig. 5, the casing 68 is provided with a division wall 69 between which there is located the cross slides 70. The cross slides are of substantial length, width, and depth and of considerable weight, being made generally of a one-piece bar with a recess 92 therein in which there is positioned a block 94 from which a cam follower 95 projects. The cam follower extends through a suitable opening in the division wall 69 of the casing 68 to engage a cam 96 which is provided with a groove 98 in which the cam follower 95 rides.

The block 94 is somewhat shorter than recess 92 to permit adjustment of the cross slides 70 relative to the cam follower 95. The adjustment is made through a pair of set screws; one set screw 100 being screw-threadedly mounted in the end of the cross slides 70 and having its inner end contacting with the block 94, whereas the other set screw 102 projects through an opening in the end of the cross slide 70 and is screw-threadedly connected to the block 94. Thus by backing of the screw 100 and then adjusting screw 102, the block 95 may be moved longitudinally within the cross slides 70 to adjust the cam follower 95, and when properly adjusted screw 100 may be screwed into abutment with the end of the block 94 to maintain same positioned. The cross slides are vertically supported one above the other; the lowermost slide 70a resting on the bottom 71 of the casing, the second or middle slide 70b resting on the top face of the slide 70a, and the uppermost or top slide 70c resting on the top face of the slide 70b. Thus as the slides are moved into and out of position they ride relative to one another and serve to maintain one another in substantially perfect alignment. Moreover, as the weight of the slides is so greatly in excess of the weight of the tool, the tool will be maintained in perfect alignment relative to the working piece.

Each cam 96 is key mounted on a shaft 97; the shaft having one end mounted in a bearing 99 carried in the casing 68 and the other end in an adjusting member 101 rotatably mounted in the casing 68 and keyed to the shaft 97. Intermediate of the adjusting member 101 and the cam 96 is a gear 103 loosely mounted on shaft 97 but adapted to be secured to the adjusting member 101. The gears 103 each mesh with worms 105 carried on the shaft 107 mounted in the bearings in the casing 68. The shaft 107 is rotatably connected through bevel gears 109 to a shaft 110, which shaft connects through suitable gears 111 to the shaft 80 which is rotatably driven, as heretofore explained, by the motor 74. Thus it will be seen that the longitudinal movements of the cross slides 70 are in timed relation to one another.

In order that the position of the cross slides 70 may be adjusted relative to one another, the adjusting member 101 is provided with a plurality of openings 112 therethrough and the gear 103 is also provided with a plurality of threaded openings 113 therein; the number of the openings in the one member being one or two less than the number of openings in the other member. There is also provided a locking bolt 114 extending through the adjusting member 101 and screw-threadedly engaging the gear 103. Thus if it is desired to adjust the cams, it is possible by removing bolt 114 from gear 103 to rotate the adjusting member 101, which, like cam 96, is geared to shaft 97, until one opening in the adjustment member is aligned with one of the openings in the gear, whereupon screw 114 would be re-inserted and the cam locked to the shaft at that position. Thus it is possible to adjust the cams relative to the cam followers independently of one another and thereby adjust the relative movements of the cross slides relative to one another. It will thus be seen that when the motor 74 rotates, the shaft 107 will also rotate to rotate the cams 96 which in turn will cause reciprocal longitudinal movement of the cam followers 95 to cause the cross slides to be moved into and out of position relative to the chucks. The adjustment of the cams may be such that one may be moved into position as the other moves out. Thus it is possible to adjust the cross slides 70 relative to the block 94 to change the positioning of the tool and, by adjusting the cam relative to the follower, to adjust the transverse movements of the cams relative to one another.

The operation of the machine will be readily understood. Assuming that the chucks are indexed at one station and rotating at said station, the tool carrier 50 will bring the spindles and tool carrier therein into engagement with the pieces carried in the chuck, and simultaneously and in timed relation thereto the motor will cause the cross slides to move transversely to perform operations on the outside surface of the piece being worked. When the work has been performed for a predetermined period of time, the tools will be withdrawn from the pieces being worked and the tool carriers and tool cross slides will move out of position relative to the pieces being worked.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a machine of the character described, a base having end walls and a wall intermediate of the end walls, a pair of horizontally disposed ways between the intermediate wall and one end wall, a work supporting device horizontally supported on said ways, said base being provided with a trough between said intermediate wall and the other end wall, a support to one side of said trough and rising above said horizontal ways, said support having a pair of vertically disposed ways, a carrier provided with a pair of vertically disposed ways adapted to cooperate with the ways of said support to space said carrier above said trough and in axial alignment with said work carrier.

2. In a machine of the character described, a base having a pair of horizontally disposed ways extending partially from one end wall toward the other end wall, a carrier supported on said ways, said base being provided with a trough intermediate of the end of said ways and the other end wall of said base, a support positioned to one side of said trough, said support having a top face and a side face, a horizontally disposed way provided on the top face and a vertically disposed way provided on the side face, said horizontally disposed way being disposed above the axial center of the work carrier, a second carrier having a horizontally disposed slide and a vertically disposed slide, the horizontal slide being disposed above the axial center thereof and adapted to cooperate with the horizontal way of said support, whereby said carrier is spaced above said trough and in axial alignment with said first-mentioned carrier.

3. In a machine of the character described, a base having a pair of horizontally disposed ways extending partially from one end wall toward the other end wall, a work carrier supported on said ways, said base being provided with a trough intermediate of the end of said ways and the other end of said base, a support positioned to one side of said trough, said support having a top face substantially above the horizontal work carriers and a side face which is one wall of the trough, a horizontally disposed way provided on the top face and having the shape of an inverted V, and a vertically disposed way provided on the side face and parallel thereto, said horizontally disposed way being disposed above the axial center of the work carrier, a tool carrier having a horizontally disposed slide and a vertically disposed slide, the horizontal slide being disposed above the axial center thereof and adapted to cooperate with the horizontal way of said support, whereby said carrier is spaced above said trough and in axial alignment with said first-mentioned carrier.

4. In a machine of the character described, a supporting base, a work carrier supported on said base, a tool carrier supported on said base in axial alignment with said work carrier, and a second tool carrier supported on said base intermediate of said work carrier and first-mentioned tool carrier and at right angles to the axis of said other carriers and comprising a casing, a plurality of cross slides carried in said casing, said lowermost slide being slidable on the base of said casing and each of said upper slides being slidable on the cross slide below it.

5. In a machine of the character described, a supporting base, a work carrier supported on said base, a tool carrier supported on said base in axial alignment with said work carrier, and a second tool carrier supported on said base intermediate of said work carrier and first-mentioned tool carrier and at right angles to the axis of said other carriers and comprising a casing, a plurality of cross slides carried in said casing, said lowermost slide being slidable on the base of said casing and each of said upper slides being slidable on the cross slide below it, means for moving said first-mentioned tool carrier longitudinally of the base, and means operated in timed relationship thereto for operating said cross slides transversely of the base.

6. In a machine of the character described, a transverse tool carrier comprising a casing, a plurality of cross slides in said casing, said cross slides being mounted one above the other with each upper slide resting on and sliding over the slide below it, a constantly rotating member, and means associated with each slide and driven by said member for moving said slides transversely in the casing.

7. In a machine of the character described, a tool carrier comprising a casing, a plurality of cross slides mounted in said casing, said cross slides being vertically disposed relative to one another with each upper slide resting on and slidable along the slide below it, a cam associated with each slide, a cam follower carried by the slide and engaging said cam, and means for simultaneously driving said cams to cause transverse movement of said slides.

8. In a machine of the character described, a tool carrier comprisng a casing, a plurality of slides in said casing, each slide comprising a metal bar of substantial length, width, and depth, said bars being vertically disposed one above the other, the upper surface of each bar forming a sliding support for the bar above it, and means for transversely moving said bars in and out of said casing.

9. In a machine of the character described, a tool carrier comprising a casing, a plurality of cross slides mounted in said casing, each cross slide comprising a bar of substantial length, width, and depth, the top surface of each bar forming a support for the bar above it, each of said bars being provided with a recess, a block in each of said recesses, the length of said block being slightly less than the length of the recess, a cam follower mounted in said block, a cam associated with each of said slides and adapted to engage said cam follower, means for adjusting said block and cam follower relative to the bar, and means for simultaneously rotating said cams, whereby said slides will be moved transversely of the casing.

10. In a machine of the character described, a tool carrier comprising a casing, a plurality of cross slides mounted in said casing, each cross slide comprising a bar of substantial length, width, and depth, the top surface of each bar forming a support for the bar above it, each of said bars being provided with a recess, a block in each of said recesses, the length of said block being slightly less than the length of the recess, a cam follower mounted in said block, a cam associated with each of said slides and adapted to engage said cam follower, means for adjusting said block and cam follower relative to the bar, means for simultaneously rotating said cams, whereby said slides will be moved transversely of the casing, and means for adjusting said cams relative to one another.

11. In a machine of the character described, a tool carrier comprising a casing, a plurality of cross slides in said casing, a plurality of cams in said casing, each cam being associated with a cross slide, a cam follower carried by each of said cross slides and adapted to engage the associated cam, a rotatable shaft supporting each of said cams, said cams being keyed to the rotatable shaft, a rotatable adjusting member keyed to each of said shafts and having a plurality of openings therethrough, a gear loosely mounted on each of said shafts, said gear having a plurality of openings therethrough of a different number than the number of openings through the adjusting member, a locking member adapted to pass through aligned holes in said member and gear to lock said adjusting member to said gear, and means for simultaneously rotating all of said gears.

12. In a machine of the character described, a substantially rectangular base, a pair of ways supported on said base and extending from one end thereof to approximately the center thereof, a work supporting device horizontally supported on said ways, said base being provided with a trough positioned below said ways and extending from the inner end of said ways to the other end of the base, a support to one side of said trough rising above said horizontal ways, said support having vertically disposed ways thereon, a carrier provided with vertically disposed ways adapted to cooperate with the ways of said support to space said carrier above said trough and in axial alignment with said work carrier.

STANLEY T. GOSS.
JOSEPH J. SPRING.